US011578543B2

(12) United States Patent
Almohsin et al.

(10) Patent No.: US 11,578,543 B2
(45) Date of Patent: Feb. 14, 2023

(54) POLYMER-SAND NANOCOMPOSITE LOST CIRCULATION MATERIAL

(71) Applicants: Alfaisal University, Riyadh (SA); Saudi Arabian Oil Company, Dhahran (SA)

(72) Inventors: Ayman Almohsin, Doha (SA); Edreese Alsharaeh, Riyadh (SA); Mohan Raj Krishnan, Riyadh (SA)

(73) Assignees: SAUDI ARABIAN OIL COMPANY, Dhahran (SA); ALFAISAL UNIVERSITY, Riyadh (SA)

( * ) Notice: Subject to any disclaimer, the term of this patent is extended or adjusted under 35 U.S.C. 154(b) by 77 days.

(21) Appl. No.: 17/066,840

(22) Filed: Oct. 9, 2020

(65) Prior Publication Data
US 2022/0112777 A1  Apr. 14, 2022

(51) Int. Cl.
| | | |
|---|---|---|
| C09K 8/512 | (2006.01) | |
| E21B 21/00 | (2006.01) | |
| C08K 3/04 | (2006.01) | |
| B82Y 30/00 | (2011.01) | |
| C08J 3/24 | (2006.01) | |
| C08K 3/22 | (2006.01) | |
| C08K 9/04 | (2006.01) | |
| C09K 8/508 | (2006.01) | |
| C09K 8/516 | (2006.01) | |

(52) U.S. Cl.
CPC ............ *E21B 21/003* (2013.01); *B82Y 30/00* (2013.01); *C08J 3/245* (2013.01); *C08K 3/042* (2017.05); *C08K 3/22* (2013.01); *C08K 9/04* (2013.01); *C09K 8/5083* (2013.01); *C09K 8/512* (2013.01); *C09K 8/516* (2013.01); *C08J 2325/06* (2013.01); *C08J 2325/16* (2013.01); *C08J 2333/12* (2013.01); *C08K 2003/2244* (2013.01); *C08K 2201/002* (2013.01)

(58) Field of Classification Search
CPC ..... E21B 21/003; E21B 33/138; B82Y 30/00; C08J 3/245; C08J 2325/06; C08J 2325/16; C08J 2333/12; C08K 3/042; C08K 3/22; C08K 9/04; C08K 2003/2244; C08K 2201/002; C09K 8/5083; C09K 8/512; C09K 8/516; C09K 2208/10; C09K 8/504
See application file for complete search history.

(56) References Cited

U.S. PATENT DOCUMENTS

| | | | |
|---|---|---|---|
| 5,465,792 | A | 11/1995 | Dawson et al. |
| 8,557,916 | B1 | 10/2013 | Msharaeh et al. |
| 2016/0340570 | A1 | 11/2016 | Salla et al. |
| 2016/0347985 | A1 | 12/2016 | Li et al. |
| 2017/0044687 | A1 | 2/2017 | Xu et al. |
| 2019/0112468 | A1 | 4/2019 | Almohsin et al. |
| 2019/0249068 | A1 | 8/2019 | Zhao et al. |
| 2021/0324256 | A1* | 10/2021 | Almohsin ............... C08K 3/11 |

FOREIGN PATENT DOCUMENTS

| | | |
|---|---|---|
| CN | 104558323 A | 4/2015 |
| CN | 104710584 A | 6/2015 |
| CN | 107814869 A | 3/2018 |
| CN | 110982011 A | 4/2020 |
| WO | 2019222034 A1 | 11/2019 |
| WO | 2021040758 A1 | 3/2021 |
| WO | 2021216134 A1 | 10/2021 |
| WO | WO 2021/216134 * | 10/2021 |

OTHER PUBLICATIONS

Michael, F.M. etal, zirconia/graphene nanocomposites effect on the enhancement of thermo-mechanical stability of polymer hydrogels, Materials Today Communications, 2019, 21, 100701.*
U.S. Notice of Allowance and Fee(s) Due dated Oct. 21, 2021 pertaining to U.S. Appl. No. 16/854,274, filed Apr. 21, 2020, 30 pages.
International Search Report and Written Opinion dated Apr. 23, 2021 pertaining to International application No. PCT/US2020/066636 filed Dec. 22, 2020, 16 pgs.
Michael, F. M. et al. "Zirconia/graphene nanocomposites effect on the enhancement of thermo-mechanical stability of polymer hydrogels", Materials Today Communications, [Online] vol. 21, Dec. 1, 2019, p. 100701.
International Search Report and Written Opinion dated Feb. 10, 2021 pertaining to International application No. PCT/US2020/055339 filed Oct. 13, 2020, 15 pgs.
Liu, Ruiqiong et al. "Tough and highly stretchable graphene oxide/polyacrylamide nanocomposite hydrogels", Journal of Materials Chemistry, vol. 22, No. 28, Jan. 1, 2012, pp. 14160-14167.
International Search Report and Written Opinion dated Jan. 29, 2021 pertaining to International application No. PCT/US2020/055337 filed Oct. 13, 2020, 17 pgs.
U.S. Office Action dated Aug. 30, 2021 pertaining to U.S. Appl. No. 16/854,323, filed Apr. 21, 2020, 33 pages.
NaturePortfolio, https://www.nature.com/subjects/gels-and-hydrogels downloaded on Aug. 10, 2021, pp. 1-4.
Katsnelson, M.I., "Graphene: Carbon in two dimensions", Materialstoday, 2007, 10, pp. 20-27.
Jiang, H. et al. "Room-temperature self-healing tough nanocomposite hydrogel crosslinked by zirconium hydroxide nanoparticles", Composites Science and Technology, 2017, 140, pp. 54-62.
U.S. Notice of Allowance and Fee(s) Due dated Dec. 10, 2021 pertaining to U.S. Appl. No. 16/854,299, filed Apr. 21, 2020, 38 pages.

(Continued)

*Primary Examiner* — Kumar R Bhushan
(74) *Attorney, Agent, or Firm* — Dinsmore & Shohl LLP (57) ABSTRACT

A method of forming a barrier to overcome lost circulation in a subterranean formation. The method includes injecting a polymer-sand nanocomposite into one or more lost circulation zones in the subterranean formation where the polymer-sand nanocomposite is formed from sand mixed with a polymer hydrogel. Further, the polymer hydrogel includes a hydrogel polymer, an organic cross-linker, and a salt. The sand additionally comprises a surface modification. The associated method of preparing a polymer-sand nanocomposite lost circulation material for utilization in forming the barrier is provided.

23 Claims, 5 Drawing Sheets

(56) References Cited

OTHER PUBLICATIONS

Almoshin et al., "A Novel Polymer Nanocomposite Graphene Based Gel for High Temperature Water Shutoff Applications", Society of Petroleum Engineers, SPE-192358-MS, 18 pgs, Apr. 2018.
Al-Muntasheri et al., "Investigation of a High Temperature Organic Water Shutoff Gel: Reaction Mechanisms", Society of Petroleum Engineers,SPE 97530, 9 pgs. Dec. 5-6, 2005.
Al-Muntasheri et al., "A Study of Polyacrylamide-Based Gels Crosslinked with Polyethyleneimine", Society of Petroleum Engineers, SPE Journal, pp. 245-251, Jun. 2009.
Alsharaeh et al., "Evaluation of Nanomechanical Properties of (Styrene-Methyl Methacrylate) Copolymer Composites Containing Graphene Sheets", American Chemical Society, vol. 52, pp. 17871-17881, Nov. 27, 2013.
Alsharaeh et al., "Microwave Irradiation Effect on the Dispersion and Thermal Stability of RGO Nanosheets within a Polystyrene Matrix", Materials, vol. 7, pp. 5212-5224, Jul. 18, 2014.
Dovan et al., "Delaying Gelation of Aqueous Polymers at Elevated Temperatures Using Novel Organic Crosslinkers", Society of Petroleum Engineers, SPE 37246, pp. 361-371, Feb. 18-21, 1997.
Fathima et al., "Polymer Nanocomposites for water shutoff application—A review", Matter Res. Express, vol. 6, 18 pgs., 2019.
Taha et al., "Nano Graphene Application Improving Drilling Fluids Performance", International Petroleum Technology Conference, IPTC-18539-MS, 16 pgs., Dec. 6-9, 2015.
Tongwa et al., "Evaluation of a Nanocomposite Hydrogel for Water Shut-Off in Enhanced Oil Recovery Applications: Design, Synthesis, and Characterization", Journal of Applied Polymer Science, 8 pgs, Jun. 15, 2012.
Zolfaghari et al., "Preparation and Characterization of Nanocomposite Hydrogels Based on Polyacrylamide for Enhanced Oil Recovery Applications", Journal of Applied Polymer Science, vol. 100, pp. 2096-2103, 2006.
International Search Report and Written Opinion dated Feb. 22, 2022 pertaining to International application No. PCT/US2021/053689 filed Oct. 6, 2021, 16 pages.

* cited by examiner

POLYMER-SAND NANOCOMPOSITE LOST CIRCULATION MATERIAL

TECHNICAL FIELD

The present disclosure relates to natural resource well drilling and hydrocarbon production from subterranean formations and, more specifically, to a polymer-sand nanocomposite for forming a barrier to overcome lost circulation in a hydrocarbon wellbore.

BACKGROUND

The discovery and extraction of hydrocarbons, such as oil or natural gas, from subterranean formations may be impeded for a variety of reasons, such as lost circulation events. Lost circulation events may lead to many undesirable consequences that could cost up to millions of dollars. The extent of the consequences may vary with severity of the loss. For instance, a lost circulation event may range from losing a portion of the drilling mud or it could result in a complete blowout. In general, the lost circulation incidents are classified based on rate of loss in barrels per house (bbl/h). When the fluid rate of loss is 1-10 bbls/h, the loss is classified as seepage loss that could occur in any type of formation. If the fluid rate of loss is increased from 10 to 500 bbls/h, the losses are known as partial losses and that could happen in gravels, small natural horizontal fractures, and drilling induced vertical fractures. When the fluid rate of loss is increased to 500 bbls/h. and above, the losses are identified as complete losses. The complete lost circulation incidents can occur in natural fractured formations, highly permeable formations or drilling induced fractures. Therefore, in order to address the loss of drilling fluids, lost circulation materials (LCM) have been commonly used to completely stop or mitigate drilling fluid losses into various natural or induced formations. LCMs are usually added continuously to the drilling mud system or used as a concentrated LCM pill in order to seal various fractures. However, traditional LCMs are limited in their ability to curb lost circulation events and stabilize the wellbore

SUMMARY

Accordingly, there is an ongoing need for methods of forming a barrier to overcome lost circulation in a subterranean formation and associated lost circulation materials which possess chemical and thermal stability. The methods of the present disclosure include preparing a polymer-sand nanocomposite as a lost circulation material. In particular, the methods of the present disclosure include preparation of a polymer-sand nanocomposite as a lost circulation material in which a polymer hydrogel and sand particles having a surface modification are combined. Combining the water reducing properties of the polymer hydrogel with sand having surface modifications forms a stable and dense filter cake which reduces drilling fluid losses into the formation and as a result, achieves stability of the wellbore.

According to one or more embodiments of the present disclosure, a method of forming a barrier to overcome lost circulation in a subterranean formation is disclosed. The method includes injecting a polymer-sand nanocomposite into one or more lost circulation zones in the subterranean formation, the polymer-sand nanocomposite comprising sand mixed with a polymer hydrogel. Additionally, the polymer hydrogel includes a hydrogel polymer, an organic cross-linker, and a salt. Further, the sand includes a surface modification.

According to one or more further embodiments of the present disclosure, a method of preparing a polymer-sand nanocomposite lost circulation material is disclosed. The method includes applying a surface modification comprising attachment of an organic cross-linker to the surface of sand particles by preparing a cross-linker solution comprising one or more organic cross-linkers, combining the cross-linker solution and the sand particles to generate a cross-linker modified sand precursor, and heating the cross-linker modified sand precursor to a temperature of 120 to 180° C. for at least 2 hours to generate a cross-linker modified sand. The method further includes preparing a polymer hydrogel by combining a hydrogel polymer, additional organic cross-linker, and a salt. Finally, the method includes combining the polymer hydrogel and the cross-linker modified sand to form the polymer-sand nanocomposite.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Reference will now be made in detail to embodiments of a method of forming a barrier to overcome lost circulation in a subterranean formation and associated method of preparing a polymer-sand nanocomposite lost circulation material for utilization in the same.

As used throughout this disclosure, the term "production tubing" refers to a wellbore tubular used to produce reservoir fluids. Production tubing is assembled with other completion components to make up the production string. The production tubing selected for any completion should be compatible with the wellbore geometry, reservoir production characteristics and the reservoir fluids.

As used throughout this disclosure, the term "coiled tubing" refers to a long, continuous length of pipe wound on a spool. The pipe is straightened prior to pushing into a wellbore and rewound to coil the pipe back onto the transport and storage spool. It will be appreciated that coiled tubing may be 5,000 meters (m) or greater in length. Coiled tubing may be provided as a secondary and separated conduit through the wellbore and may be passed within the annulus of the production tubing. Coiled tubing may also be used as part of the production tubing.

The present disclosure is directed to compositions and methods for overcoming lost circulation in a subterranean formation. A subterranean formation is the fundamental unit of lithostratigraphy. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions include hydrocarbons and others do not. To produce hydrocarbons from the hydrocarbon regions of the subterranean formation, production wells are drilled to a depth that enables these hydrocarbons to travel from the subterranean formation to the surface.

The hydrocarbons from the hydrocarbon regions of the subterranean formation passes through fractures in the subterranean formation to reach a wellbore for extraction to the surface. As used in the present disclosure, the term "wellbore" may refer to the drilled hole or borehole, including the openhole or uncased portion of the well. Initially, the formation pressure may be considerably greater than the downhole pressure inside the wellbore. This differential pressure may drive hydrocarbons through fractures in the subterranean formation toward the wellbore and up to the surface.

However, the wellbore may also be in fluid communication with geological formations which allow drilling fluid, alternatively known as drilling mud, to flow instead of returning up the annulus. These geological formations which result in a lost circulation of the drilling fluid may be termed lost circulation zones.

Embodiments of the present disclosure include methods of forming a barrier to overcome lost circulation in a subterranean formation. The method includes injecting a polymer-sand nanocomposite into one or more lost circulation zones in the subterranean formation. In accordance with the present disclosure, the polymer-sand nanocomposite may be formed from a sand with a surface modification mixed with a polymer hydrogel, where the polymer hydrogel comprises a hydrogel polymer, an organic cross-linker, and a salt.

Figure 1A:
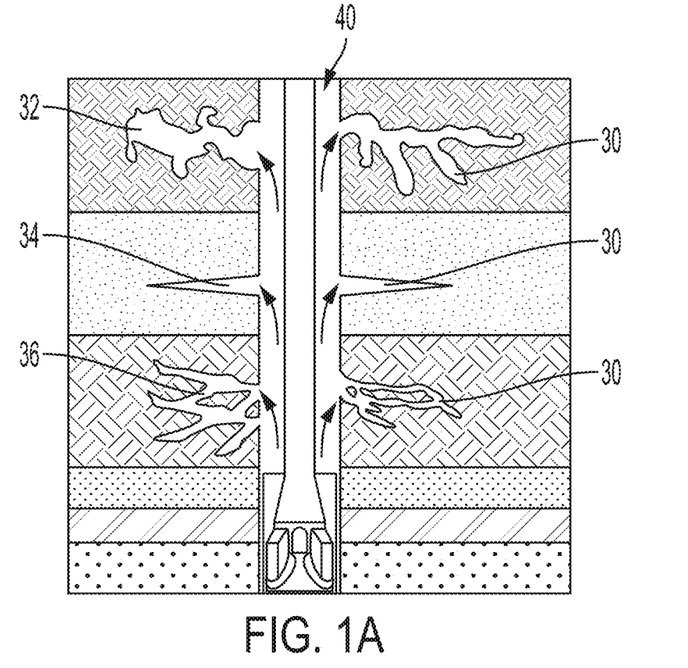
FIG. 1A is a schematic drawing of a subterranean formation showing lost circulation zones.
Figure 1B:
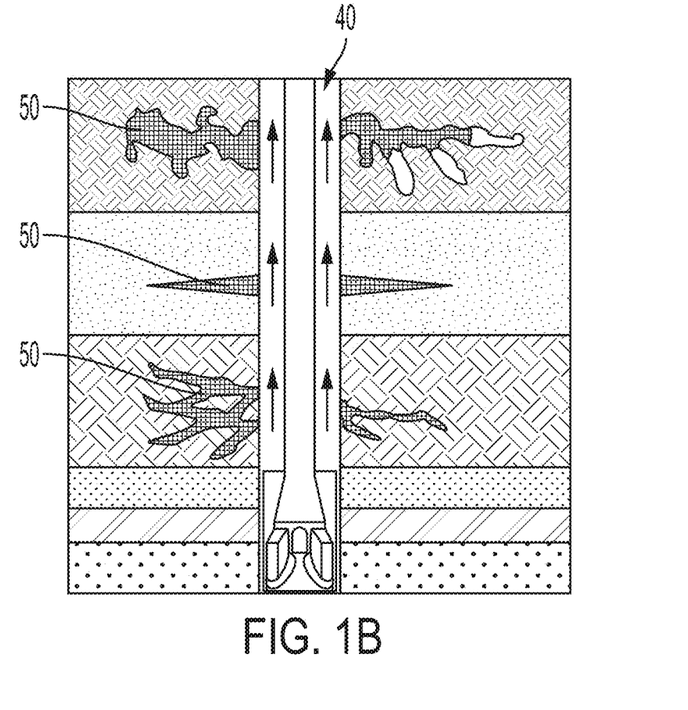
FIG. 1B is a schematic drawing of the subterranean formation of FIG. 1A with injection of the polymer-sand nanocomposite in accordance with one or more embodiments described in this disclosure.

With reference to FIGS. 1A and 1B, a production well is illustrated. To recover hydrocarbons within the subterranean formation, a wellbore 40 is provided within the subterranean formation to establish fluid contact with hydrocarbon bearing zones of the subterranean formation. However, the subterranean formation may be interlaced with fractures 30 which facilitate flow of hydrocarbons through the subterranean formation, but may also result in lost circulation of drilling fluid during drilling operations. Various types of fractures 30 include cavernous formations 32, induced fractures 34, and natural fractures 36. A cavernous formation 32 may be a large hollow void in the subterranean formation which would readily allow drilling fluid to enter and be diverted from returning to the surface through the annulus. Induced fractures 34 are areas of cracking or increased permeability in the subterranean formation resulting from aspects of the drilling operation. For example, elevated pressure in the wellbore from pumping of the drilling fluid may result in separation of layers and opening of channels according to the natural stresses within the formation. Similarly, natural fractures 36 include separation of layers and channels throughout the formation resulting from natural geological movement and stress relief within the formation. It will be appreciated that each of cavernous formations 32, induced fractures 34, and natural fractures 36 present challenges to drilling operations as the drilling fluid may be diverted into the cavernous formations 32, induced fractures 34, and natural fractures 36 instead of being returned via the annulus, thereby resulting in lost circulation.

The cavernous formations 32, induced fractures 34, and natural fractures 36 of the subterranean formation may be sequestered from the wellbore 40 by introduction of the polymer-sand nanocomposite into any of the cavernous formations 32, induced fractures 34, and natural fractures 36 in the subterranean formation which create lost circulation. FIG. 1A provides an illustration of the subterranean formation prior to treatment in accordance with methods of the present disclosure and FIG. 1B provides an illustration of the lost circulation zones obstructed with the polymer-sand nanocomposite 50.

It will be appreciated that the fractures 30 interlaced throughout the subterranean formation may be naturally occurring or induced with enhanced oil recovery techniques such as fracturing operations or as a natural result of the drilling operation. The methods for forming a barrier to overcome lost circulation in a subterranean formation with the polymer-sand nanocomposite of the present disclosure may be applied to all fractures 30, inclusive of cavernous formations, regardless of whether they are naturally occurring or induced as part of the drilling operations.

Forming a barrier to overcome lost circulation in a subterranean formation involves injecting a polymer-sand nanocomposite in accordance with the present disclosure into one or more lost circulation zones in the subterranean formation. It will be appreciated that the polymer-sand nanocomposite may be injected into the fractures 30 in accordance with methods and techniques familiar to those skilled in the art for placement of drilling or treatment fluids within the fractures or cavernous formations of a subterranean formation to impede lost circulation. In one or more embodiments, the polymer-sand nanocomposite may be injected into the lost circulation zones via coiled tubing or production tubing placed downhole. The polymer-sand nanocomposite may further be directed to the fractures or cavernous formations desired for treatment with the placement of bridge plugs or other devices to direct or obstruct flow.

Figure 2:
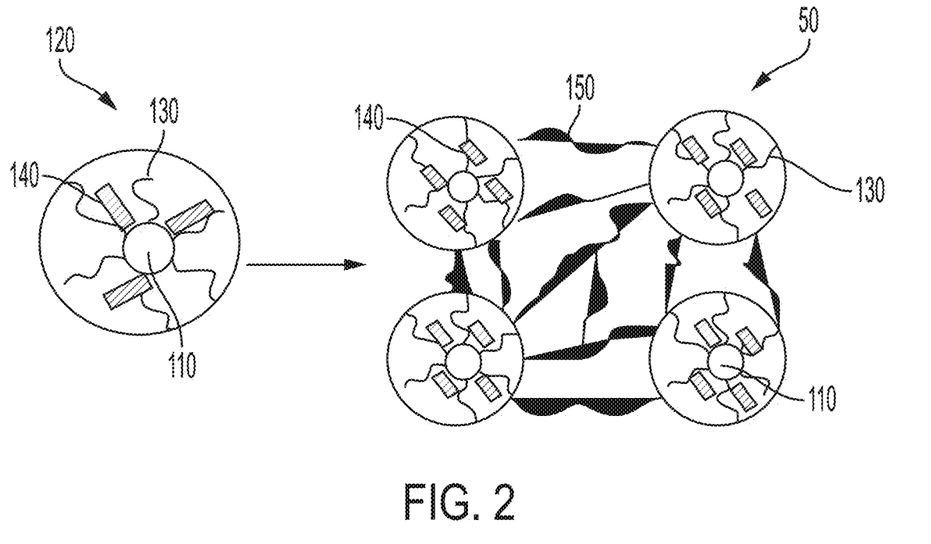
FIG. 2 is a schematic drawing of a polymer-sand nanocomposite in accordance with one or more embodiments described in this disclosure.
Figure 3:
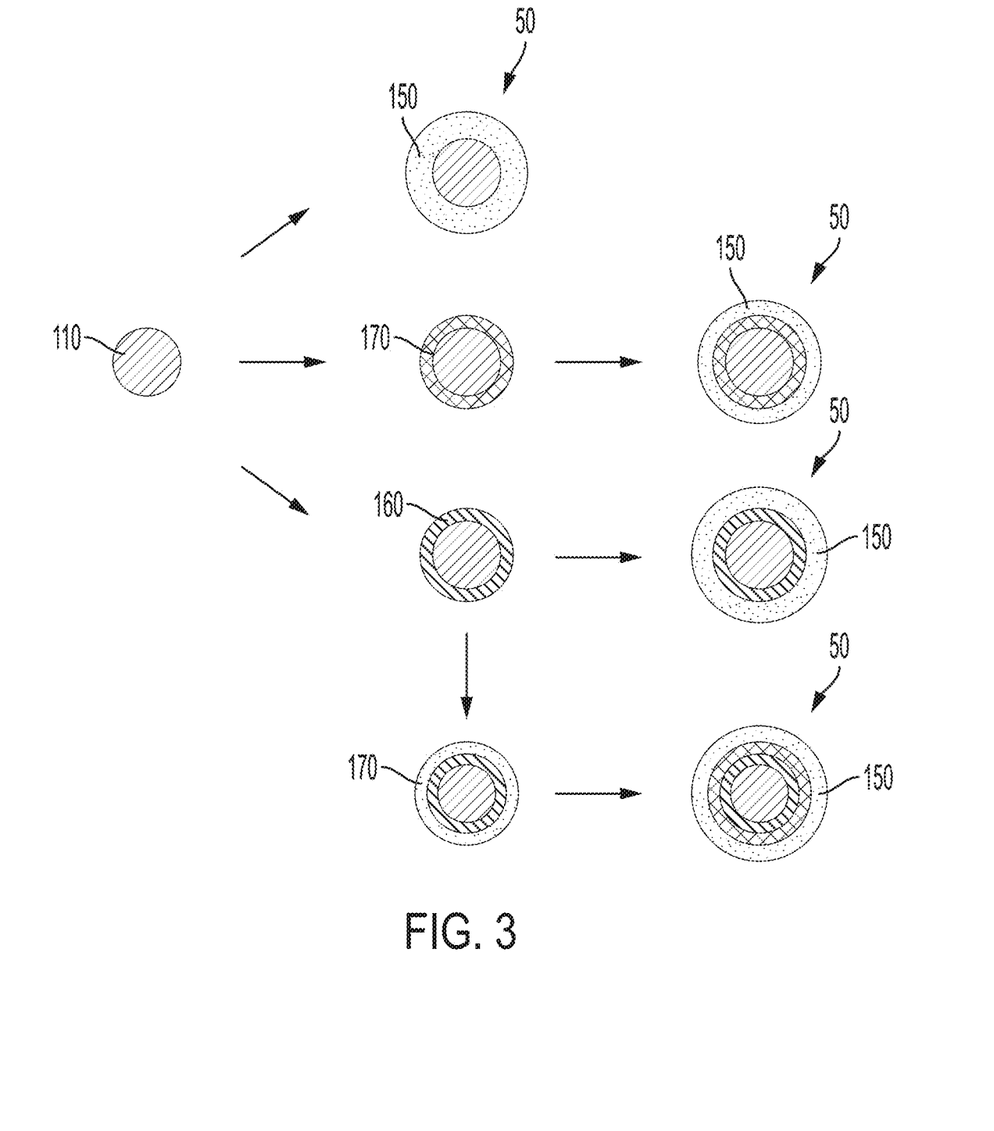
FIG. 3 is a flowchart illustrating preparation of a polymer-sand nanocomposite according to various embodiments of the present disclosure.

The polymer-sand nanocomposite 50 for implementation as a lost circulation material is formed by combining a polymer hydrogel 150 and prepared sand. With reference to FIGS. 2 and 3, the prepared sand is generated from sand particles 110 and may be provided as neat sand comprising unmodified sand particles 110 or as a sand having one of various surface modifications. Sand with surface modifications may include a sand-copolymer-graphene nanocomposite 120, a cross-linker modified sand 190A/190B, or sand with a surface polymerization 200. Preparation of the various embodiments of the polymer-sand nanocomposite 50 and the various forms of the prepared sand are provided throughout the present disclosure. In one or more embodiments, the sand particles 110 utilized for the prepared sand may have a size distribution of 20 mesh (840 micrometers) to 40 mesh (420 micrometers).

In one or more embodiments and with reference to FIG. 2, the sand-copolymer-graphene nanocomposite 120 is prepared by applying a polymer coating to the surface of the sand particles 110. The polymer coating may be applied to the surface of the sand particles 110 by combining a polymerization initiator dissolved in a solvent with the sand particles 110 to form a precursor sand mixture, combining a co-monomer and additional polymerization initiator in the presence of graphene 140 to form a precursor polymer mixture, and combining the precursor sand mixture and the precursor polymer mixture to form the sand-copolymer-graphene nanocomposite 120. As such, the sand-copolymer-graphene nanocomposite 120 may be characterized by a sand particle 110 forming a core with co-polymer 130 formed from polymerization of the co-monomer and graphene 140 forming a shell. It will further be understood that the graphene 140 is not functionalized prior to formation of the precursor polymer mixture.

The polymerization initiator may be dissolved in a solvent and combined with the sand particles 110 to form the precursor sand mixture. In one or more embodiments, the polymerization initiator is primarily peroxide which is susceptible to dissociate into radicals under exposure of light or heating conditions. For example, the polymerization initiator may be azobisisobutyronitrile (AIBN) or benzoyl peroxide. Further examples include tert-Amyl peroxybenzoate, 1,1'-Azobis(cyclohexanecarbonitrile), 1,1-Bis(tert-butylperoxy)cyclohexane, 2,5-Bis(tert-butylperoxy)-2,5 dimethyl hexane 2,5-Bis(tert-Butylperoxy)-2,5 dimethyl 3-hexyne, tert-Butyl hydroperoxide, tert-Butyl peracetate, tert-Butyl peroxide, tert-Butyl peroxybenzoate, tert-Butylperoxy isopropyl carbonate, cumene hydroperoxide, cyclohexanone peroxide, dicumyl peroxide, lauroyl peroxide, 2,4-pentanedione peroxide, peracetic acid, and Potassium persulfate. The polymerization initiator may be dissolved in a solvent for mixture with the sand particles 110. The polymerization initiator and solvent may be combined in a range between 1 to 10 weight percent (wt. %) of initiator to solvent. In one or more embodiments, the solvent is an organic solvent. For example, the solvent may be acetone, methanol, ethanol, iso-propanol, n-propanol, chloroform, tetrahydrofuran, or N-methyl pyrrolidone.

In one or more embodiments, the polymerization initiator may be combined with the sand particles 110 and mixed with sonication for at least 30 minutes. In various embodiments, the sonication to mix the polymerization initiator and the sand particles 110 may be sustained for 30 minutes to 2 hours, 30 minutes to 1.5 hours, 45 minutes to 1.25 hours, or approximately 1 hour.

Upon completion of the sonication, the mixture of the polymerization initiator and the sand particles 110 may be heated to remove the solvent in an expeditious manner to form the precursor sand mixture. In various embodiments, the temperature of the mixture of the polymerization initiator and the sand particles 110 may be raised to 35° C. to 70° C., 40° C. to 70° C., or approximately 45° C. It will be appreciated that the solvent may also be removed from the mixture of the polymerization initiator and the sand particles 110 to alternatively form the precursor sand mixture through natural evaporation without supplemental heating or through vacuum assisted evaporation to accelerate the evaporation rate of the solvent through pressure adjustment.

The precursor polymer mixture may be formed by combining a co-monomer and an additional polymerization initiator in the presence of graphene 140. In one or more embodiments, the co-monomer and graphene 140 are mixed and then the polymerization initiator is added to the previously combined co-monomer and graphene 140 mixture. It will be appreciated that if the graphene 140 is not premixed with the co-monomer, there may be a reduction in the final dispersion within the polymer matrix of the formed co-polymer 130. The co-monomer, graphene 140, and polymerization initiator may then be mixed with sonication. In various embodiments, the sonication to mix the co-monomer, graphene 140, and polymerization initiator may be sustained for 5 minutes to 30 minutes, 5 minutes to 20 minutes, approximately 10 minutes, at least 5 minutes, or at least 10 minutes. It will be appreciated that the co-monomer may form the co-polymer 130 upon introduction of the polymerization initiator. In one or more embodiments, the mixture of the co-polymer 130, graphene 140, and polymerization initiator may be dried in an oven or equivalent. For example, the mixture of the co-polymer 130, graphene 140, and polymerization initiator may be dried in an oven overnight. The polymerization initiator may be AIBN or benzoyl peroxide, for example, and should be selected to match that utilized in formation of the precursor sand mixture.

In various embodiments, the co-monomers utilized to form the polymer coating of the sand-copolymer-graphene nanocomposite 120 may be selected to form two or more co-polymers 130 of polystyrene (PS), poly(methyl methacrylate) (PMMA), polyacyrlonitrile (PAN), polyvinyl alcohol (PVA), polyethylene terephthalate (PET), polybutylene terephthalate (PBT), hydrolyzed polyacrylamide (HPAM), polycarbonate, polyethylene (PE), polyurethane (PU), polypropylene (PP), divinyl benzene (DVB), and acrylonitrile butadiene styrene. In one or more embodiments, the co-monomers may comprise a styrene monomer and a methyl methacrylate monomer to form a co-polymer 130 of PS and PMMA.

In one or more embodiments, the co-monomer may comprise a styrene monomer and a methyl methacrylate monomer. In one or more embodiments, the co-monomer comprises a styrene monomer and a methyl methacrylate monomer at a volumetric ratio of 1:2 to 2:1. In one or more further embodiments, the co-monomer comprises a styrene monomer and a methyl methacrylate monomer at a volumetric ratio of 2:3 to 3:2.

In one or more embodiments, the co-monomer is mixed with graphene 140 at a ratio of 2 to 8 wt. % graphene 140 in the precursor polymer mixture. In various further embodiments, the co-monomer is mixed with graphene 140 at a ratio of 2 to 6 wt. % graphene 140, 3 to 5 wt. % graphene 140, or approximately 4 wt. % graphene 140 in the precursor polymer mixture. It will be appreciated that insufficient graphene may not achieve the disclosed property enhancements and excess graphene may result in non-uniform dispersibility issues.

The sand-copolymer-graphene nanocomposite 120 is formed by combining the precursor sand mixture and the precursor polymer mixture. In one or more embodiments, the precursor polymer mixture is added gradually in combination with mixing to the precursor sand mixture. The mixing coats the individual sand particles 110 with the precursor polymer mixture to form a polymer coating onto the sand 110 directly. In one or more embodiments, the mixing may be carried out by paddle mixer or mechanical mixer for a period of at least 5 min to achieve sufficient integration and coverage of the sand particles.

Upon completion of the mixing of the precursor sand mixture and the precursor polymer mixture to achieve coverage of the co-polymer 130 and graphene 140 across the surface of each individual sand particle 110, the mixture may be heated to remove moisture from the resulting sand-copolymer-graphene nanocomposite 120 in an expeditious manner. In various embodiments, the temperature of the mixture of the precursor sand mixture and the precursor polymer mixture may be raised to 50° C. to 80° C., 60° C. to 80° C., 70° C. to 80° C., or approximately 70° C. In various embodiments, the elevated temperature of the mixture of the precursor sand mixture and the precursor polymer mixture may be maintained for at least 30 minutes, at least 1 hour, 30 minutes to 2 hours, or 30 to 60 minutes.

In one or more embodiments, the prepared sand is generated by applying a surface polymerization 160 to the sand particles 110 to generate the sand with a surface polymerization 200. The surface polymerization 160 of the sand particles 110 may form a 3D-terpolymer network on the surface of the sand particles 110. Three or more monomers may be combined with the sand particles 110 to generate the sand with a surface polymerization 200. Initially, the sand particles are surface modified with the polymerization initiator. The initiator modified sand particles are then mixed with monomers and additional polymerization initiator and heated to induce polymerizaiton. It will be appreciated that the polymerizaiton initiator dissociates into radicals under heating conditions. With the aid of the polymerization initiator radicals, the monomer molecules are synchronously transformed into monomer and cross-linker free radicals. Thereafter, the monomer and cross-linker free radicals are converted into radical donors to the neighboring monomer molecules and the cross-linker. Consequently, a random addition copolymerization between each monomer produces polymer chain radicals, resulting in chain propagation. During chain propagation, the growing chains may also react with the cross-linker radicals randomly. As a result, an interpenetrating and 3D-cross-linked polymer network structure is formed. As such, the sand with a surface polymerization 200 may be characterized by a sand particle 110 forming a core with the surface polymerization 160 forming a shell of the 3D-terpolymer network on the surface of the sand particles 110.

In various embodiments, the monomers utilized to form the surface polymerization 160 on the surface of the sand particles 110 may be selected to form a terpolymer comprising three or more of polystyrene (PS), poly(methyl methacrylate) (PMMA), polyacyrlonitrile (PAN), polyvinyl alcohol (PVA), polyethylene terephthalate (PET), polybutylene terephthalate (PBT), hydrolyzed polyacrylamide (HPAM), polycarbonate, polyethylene (PE), polyurethane (PU), polypropylene (PP), divinyl benzene (DVB), and acrylonitrile butadiene styrene.

In one or more embodiments, the monomers forming the terpolymer may comprise a styrene monomer, a methyl methacrylate monomer, and a divinyl benzene monomer to form a terpolymer of polystyrene, poly(methyl methacrylate), and divinyl benzene. In one or more embodiments, the styrene monomer, the methyl methacrylate monomer are mixed in an approximately 1:1 ratio by weight with the divinyl benzene provided in the range of 1 wt % to 10 wt % with respect to the total weight of monomers. Additionally, in one or more embodiments styrene may be 1-99 wt %, methyl methacrylate may be 1-99 wt %, and divinyl benzene may be 0.5 to 30 wt % with respect to the total weight of monomers.

In one or more embodiments, the prepared sand is generated by attaching an organic cross-linker layer 170 to the sand particles 110 to generate the cross-linker modified sand 190A/190B. Attachment of the organic cross-linker layer 170 comprises preparing a cross-linker solution comprising one or more organic cross-linkers and then combining the cross-linker solution and the sand particles 110 to generate a cross-linker modified sand precursor. The cross-linker modified sand precursor may then be heated to generate the cross-linker modified sand 190A/190B.

In one or more embodiments, the organic cross-linker utilized to generate the organic cross-linker layer 170 of the cross-linker modified sand 190A/190B may comprise a mixture of hydroquinone (HQ) and hexamethylenetetramine (HMT). In various further embodiments, the organic cross-linker may be N,N'-methylenebisacrylamide (NBAM), phenol/formaldehyde, polyethylenimine (PEI), acetylsalicylic acid (ASA), catechol, or resorcinol. The sand particles 110 may be modified with the organic cross-linker provided at 0.1 to 10 wt. % with respect to weight of the sand particles. In one or more specific embodiments, a mixture of hydroquinone (HQ) and hexamethylenetetramine (HMT) are added in a 1:2 to 2:1 weight ratio.

In one or more embodiments, the cross-linker modified sand precursor is heated to a temperature of 120 to 180° C. for at least 2 hours to generate the cross-linker modified sand 190A/190B. In various further embodiments, the cross-linker modified sand precursor may be heated to a temperature of 120 to 180° C., 130 to 170° C., 140 to 160° C., or approximately 150° C. for a period of at least 2 hours, at least 4 hours, at least 6 hours, or approximately 8 hours as well as the combinations and permutations thereof. The heating for an extended period of time results in the organic cross-linker affixing to the surface of the sand particles 110 to form the organic cross-linker layer 170 of the cross-linker modified sand 190A. Such modification of the sand particles 110 to include attachment of the organic cross-linker enhances subsequent crosslinking between the prepared sand and the polymer hydrogel 150.

It will be appreciated that during the cross-linker modification of sand with HQ and HMT, the HMT is initially decomposed under heating conditions into formaldehyde through methanediol formation (step 1) and the formaldehyde subsequently reacts with the HQ to form 2,3,5,6 tetramethylolhydroquinone (step 2). Further, the generated 2,3,5,6 tetramethylolhydroquinone is attached to the sand particles 110 through the hydroxyl groups by forming carbon-oxygen covalent bonds (step 3).

In one or more embodiments, the sand with a surface polymerization 200 may be further modified to include attachment of the organic cross-linker and formation of an organic cross-linker layer 170. Specifically, the sand with a surface polymerization 200 may be combined with the cross-linker solution comprising one or more organic cross-linkers to generate the cross-linker modified sand precursor. The cross-linker modified sand precursor may then be heated to generate the cross-linker modified sand 190B in the same manner as when sand particles 110 without prior modification were utilized. Such cross-linker modified sand 190B would include both the surface polymerization 160, such as a 3D-terpolymer network on the surface of the sand particles 110, as well as attachment of the organic cross-linker to from the organic cross-linker layer 170.

The polymer hydrogel 150 is formed by combining the hydrogel polymer, the organic cross-linker, and the salt. In one or more embodiments, preparing the polymer hydrogel 150 further comprises combining a filler comprising zirconium hydroxide with water prior to addition of the hydrogel polymer, the organic cross-linker, and the salt. Specifically, the filler comprising zirconium hydroxide may be added to water and sonicated for a period to fully wet the filler. In various embodiments, the sonication to mix the water and filler may be sustained for 2 minutes to 1 hour, 5 minutes to 30 minutes, 10 minutes to 20 minutes, or approximately 15 minutes. It will be appreciated that while the filler and water were combined via sonication, other methods of mixing the constituent components together may also be utilized as known to those skilled in the art.

In one or more embodiments, the water used for wetting the filler comprising zirconium hydroxide may be distilled water. It will be appreciated that various metal and non-metal ions in non-distilled water could interfere the ongoing chemical reactions.

In one or more embodiments, the filler may be zirconium hydroxide. When utilizing zirconium hydroxide as the filler, in various embodiments, the filler may be combined with the water as 0.2 to 10 wt. %, 0.4 to 5 wt. %, 0.6 to 2 wt. %, 0.6 to 1 wt. %, or approximately 0.8 wt. % $Zr(OH)_4$ relative to the polymer hydrogel.

In one or more embodiments, the filler may be ZrG5. ZrG5 is a composite of zirconium hydroxide and 5 wt. % graphene. When utilizing ZrG5 as the filler, in various embodiments, the filler may be combined with the water as 0.05 to 1 wt. %, 0.1 to 0.8 wt. %, 0.1 to 0.3 wt. %, or approximately 0.2 wt. % ZrG5 relative to the polymer composite hydrogel.

The hydrogel polymer may be combined with water or the water and filler mixture. In various embodiments, the hydrogel polymer may be added to comprise 1 to 8 wt. %, 2 to 6 wt. %, 3 to 5 wt. %, or approximately 4 wt. % of the final polymer-sand nanocomposite. In one or more embodiments, the hydrogel polymer may be combined with the water or the water and filler mixture to form a homogenous solution. In various embodiments, the hydrogel polymer and the water or the water and filler mixture may be stirred for 10 minutes to 4 hours, 30 minutes to 2 hours, 45 minutes to 1.5 hours, or approximately 1 hour with a magnetic stirrer or other mixing system known to those skilled in the art.

In various embodiments, the hydrogel polymer is polyacrylamide (PAM), polyacyrlonitrile (PAN), polyvinyl alcohol (PVA) Polyethylene terephthalate (PET), polybutylene terephthalate (PBT), hydrolysed PAM (HPAM), polycarbonate, polyethylene (PE), polyurethane (PU), polypropylene (PP), or acrylonitrile butadiene styrene. In one or more particular embodiments, the hydrogel polymer is PAM having a molecular weight ranging from 100,000 to 1,000,000 grams per mole (g/mol). In one or more embodiments, the PAM may be a low molecular weight PAM having a molecular weight of approximately 550,000 g/mol.

In one or more embodiments, the organic cross-linker and the salt are added to the previously combined water and hydrogel polymer. Specifically, the organic cross-linker and the salt may be added to the hydrogel polymer and water mixture and stirred for an additional 2 to 30 minutes, 5 to 25 minutes, 10 to 20 minutes, or approximately 15 minutes with a magnetic stirrer or other mixing system known to those skilled in the art. The stirring integrates the organic cross-linker and dissolves the salt into the mixture of water and hydrogel polymer.

The organic cross-linker should include the presence of hydroxyl and amine groups. In various embodiments, the organic cross-linker is N,N'-methylenebisacrylamide (NBAM), a mixture of hydroquinone (HQ) and hexamethylenetetramine (HMT), phenol/formaldehyde, polyethylenimine (PEI), acetylsalicylic acid (ASA), catechol, or resorcinol. In one or more specific embodiments, the organic cross-linker is N,N'-methylenebisacrylamide or a mixture of HQ and HMT. The organic cross-linker may be added to comprise 0.25 to 5 wt. % of the final polymer-sand nanocomposite 50. In one or more specific embodiments, a mixture of hydroquinone (HQ) and hexamethylenetetramine (HMT) are added in a 1:2 to 2:1 weight ratio.

In various embodiments, the salt is a monovalent salt, a divalent salt, or a combination of monovalent and divalent salts. For example, the salt may be one or more of KCl, $MgCl_2$, $CaCl_2$, or NaCl. The salt may be added to comprise 0.25 to 5 wt. % of the final polymer-sand nanocomposite 50. The weight percentage of salt may vary depending on reservoir conditions with the addition of salt to mimic the reservoir conditions.

In one or more embodiments, graphene 140 is additionally provided in combination with the hydrogel polymer, the organic cross-linker, and the salt forming the polymer hydrogel 150. The graphene 140 may be provided in the polymer hydrogel 150 such that graphene 140 comprises 0.1 to 4 wt. % of the final polymer-sand nanocomposite 50. In various further embodiments, the graphene 140 may be provided in the polymer hydrogel 150 such that graphene 140 comprises 0.5 to 3.5 wt. %, 1 to 3 wt. %, 1.5 to 2.5 wt. %, or approximately 2 wt. % of the final polymer-sand nanocomposite 50. It will be appreciated that insufficient graphene may not achieve the disclosed property enhancements and excess graphene may result in non-uniform dispersibility issues.

The polymer-sand nanocomposite 50 is then formed by combining the polymer hydrogel 150 and the prepared sand. The polymer hydrogel 150 and the prepared sand crosslink forming the polymer-sand nanocomposite 50. To initiate the cross-linking, the prepared sand and the polymer hydrogel 150 may be mixed and then heated for a formation period. In various embodiments, the formation period may comprise heating the mixture to at least 150° C. for at least 8 hours, at least 24 hours, or at least 36 hours.

It will be appreciated that the formation period may occur subsequent to injection of the constituent components of the polymer-sand nanocomposite 50 within the lost circulation zones. Specifically, the natural increase in temperature within subterranean formations as the depth is increased may be utilized to heat the polymer hydrogel 150 and the prepared sand to generate the polymer-sand nanocomposite 50. Further, the prepared sand, the hydrogel polymer, the organic cross-linker, and the salt may be injected into the subterranean formation split between two or more separate streams such that the polymer-sand nanocomposite 50 is formed in-situ.

It will be appreciated that the various modifications to the sand particles 110 may be utilized in combination to generate polymer-sand nanocomposite 50 with differing parameters. For example, when utilizing PAM as the hydrogel polymer, sand-copolymer-graphene-PAM, sand-PAM, sand-(PAM-Graphene), cross-linker modified sand-PAM, cross-linker modified sand-(PAM-Graphene), 3D-terpolymer network modified sand-PAM, 3D-terpolymer modified sand- (PAM-Graphene), and cross-linker modified (sand-copolymer-graphene)-PAM may each be generated in accordance with the present disclosure. The various polymer-sand nanocomposites 50 are illustrated in FIGS. 2 and 3. The processing parameters utilized to generate each of the varying polymer-sand nanocomposites 50 are provided in Table 1.

TABLE 1

| Polymer-Sand Nanocomposite Type | Prepared Sand Type | Graphene Incorporation |
|---|---|---|
| sand-copolymer-graphene-PAM | sand-copolymer-graphene nanocomposite | With polymer coating |
| sand-PAM | Unmodified sand particles (neat) | — |
| sand-(PAM-Graphene) | Unmodified sand particles (neat) | With polymer hydrogel |
| cross-linker modified sand-PAM | cross-linker modified sand | — |
| cross-linker modified sand-(PAM-Graphene) | cross-linker modified sand | With polymer hydrogel |
| 3D-terpolymer network modified sand-PAM | sand with a surface polymerization | — |
| 3D-terpolymer modified sand-(PAM-Graphene) | sand with a surface polymerization | With polymer hydrogel |
| cross-linker modified (sand-copolymer-graphene)-PAM | sand-copolymer-graphene nanocomposite | With polymer coating |

The presence of graphene in the polymer-sand nanocomposite 50, whether in the prepared sand or in the polymer hydrogel 150, provides both thermal and mechanical stability to the polymer-sand nanocomposite 50. Specifically, the graphene provides thermal stability to the polymer-sand nanocomposite 50 because the graphene is inherently thermally stable as it has very high thermal conductivity of approximately 5300 watts per meter-kelvin (W/(m·K). The graphene provides mechanical stability to the polymer-sand nanocomposite 50 because of the inherent high mechanical stability of graphene. For example, the intrinsic tensile strength of graphene is approximately 130 gigapascals (GPa) and Young's modulus as great as 1 terapascal (TPa).

Additionally, it will be appreciated that inclusion of sand 110 within the structure of the polymer-sand nanocomposite 50 provides multiple desirable benefits. For example, the sand 110 provides a relatively low cost agent to reduce the cost per volume in filling or blocking a lost circulation zone. Further, the sand 110 adds strength to the polymer-sand nanocomposite 50.

EXAMPLES

The following examples illustrate features of the present disclosure but are not intended to limit the scope of the disclosure.

An example polymer-sand nanocomposite was prepared to test and demonstrate the stability of the formed polymer-sand nanocomposite under reservoir temperature and conditions. Initially a polymer coating was added to the surface of sand particles in accordance with methods described in the present disclosure. Specifically, the precursor sand mixture was formed by mixing 300 grams (g) of sand with 0.150 g. of AIBN as the polymerization initiator at room temperature. The AIBN was dissolved in 100 milliliters (mL) of acetone. The mixing of the sand and AIBN was completed by sonication of the mixture for 1 hour. Subsequently, the combined mixture was dried at 45° C. for overnight. The precursor polymer mixture was formed by mixing a co-monomer of 5 ml of styrene (STY) and 5 ml of methyl methacrylate (MMA) in the presence of 4 wt. % (40 milligrams) of a non-functionalize graphene with 20 milligrams (mg) AIBN. The formed solution was then sonicated for 10 minutes. Subsequently, the formed precursor sand mixture and precursor polymer mixture were combined together and mixed and then dried in an oven at 70° C. overnight to form the sand-copolymer-graphene nanocomposite.

The polymer hydrogel was formed in accordance with the methods of the present disclosure. Specifically, 0.8 wt. % Zr(OH)$_4$ (40 mg) or 0.2 wt. % ZrG5 (10 mg) was added to 5 ml of distilled water and sonicated for 15 minutes. Subsequently, 4 wt. % of PAM (200 mg) having a molecular weight of 550,000 g/mol was added and integrated by magnetic stirrer for 1 hour. Then 0.3 wt. % of HG and HMT (60 mg) in a 1:1 ratio and 2 wt. % KCl were added and stirred for an additional 15 minutes. The formed solution was then flushed with nitrogen for about 30 seconds to 1 minute.

The sand-copolymer-graphene nanocomposite and the polymer hydrogel were then combined and placed in an oven at 150° C. for 48 hours to form the final polymer-sand nanocomposite for stability testing.

Figure 4:
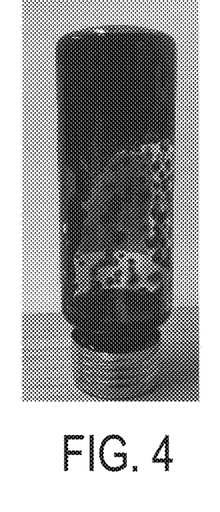
FIG. 4 is a photograph of a polymer-sand nanocomposite prepared in accordance with one or more embodiments described in this disclosure after 15 days of curing at 150° C.

To test the stability of the polymer-sand nanocomposite, the formed polymer-sand nanocomposite was placed in an oven at 150° C. for 15 days. At the conclusion of the 15 days it was demonstrated that the polymer-sand nanocomposite was still stable and well gelled with the polymer-sand nanocomposite remaining compacted. The test specimen is illustrated in FIG. 4 in an inverted vial at the conclusion of the 15 day cure at 150° C. and shows the retention of gelled characteristics. This extended period of thermal stability is beneficial to lost circulation aversion applications, especially in reservoirs at elevated temperatures, as it allows the polymer-sand nanocomposite to be retained in the fractures connected to the lost circulation zones without breakdown. It will be appreciated that subterranean formations commonly have natural or induced fractures which experience temperatures in the range of 90 to 150° C. and as such, the polymer-sand nanocomposite of the present disclosure being demonstrated to retain its gelled characteristics at 150° C. allows it to be implemented in lost circulation aversion operations without thermal breakdown.

Further evaluation of the example polymer-sand nanocomposite demonstrated thermal stability up to a temperature of 180° C. before breakdown of the gelling in the polymer-sand nanocomposite. Specifically, thermogravimetric and dynamic scanning calorimetric data confirm stability of the material up to 180° C. before instability is noted.

Figure 5A:
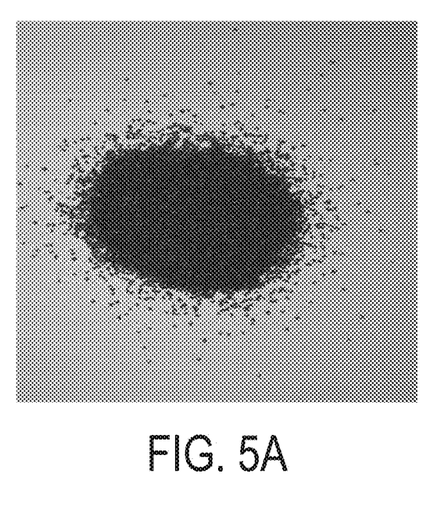
FIG. 5A is a photograph of a sand-copolymer-graphene nanocomposite prepared in accordance with one or more embodiments described in this disclosure.
Figure 5B:
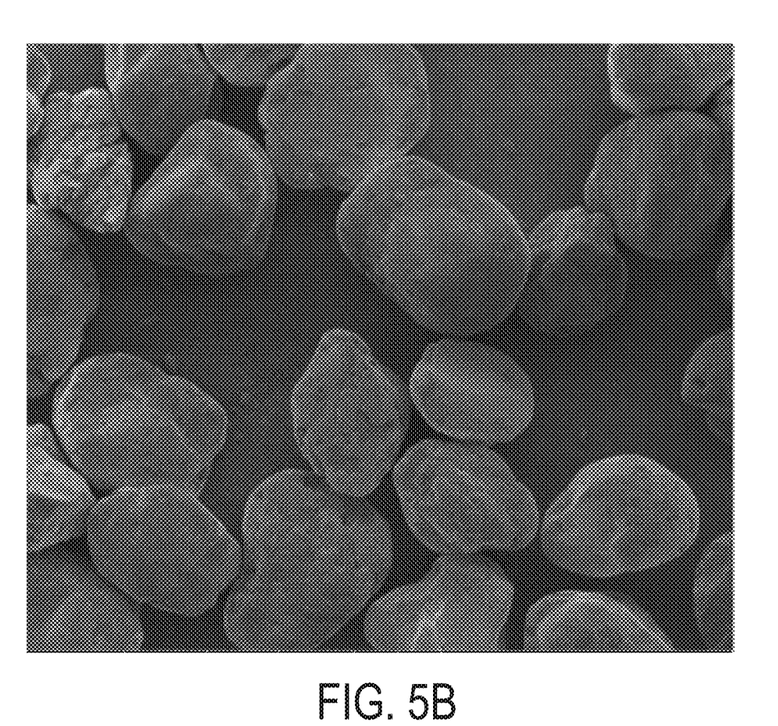
FIG. 5B is a SEM image of the sand-copolymer-graphene nanocomposite of FIG. 5A.

The sand-copolymer-graphene nanocomposite used to form the example polymer-sand nanocomposite is illustrated in FIGS. 5A and 5B. FIG. 5A shows the granular nature of the sand particles having a polymer coating of polystyrene and poly(methyl methacrylate) in conjunction with graphene. Further, FIG. 5B provides a SEM image of the individual sand particles with the polymer coating.

Figure 6A:
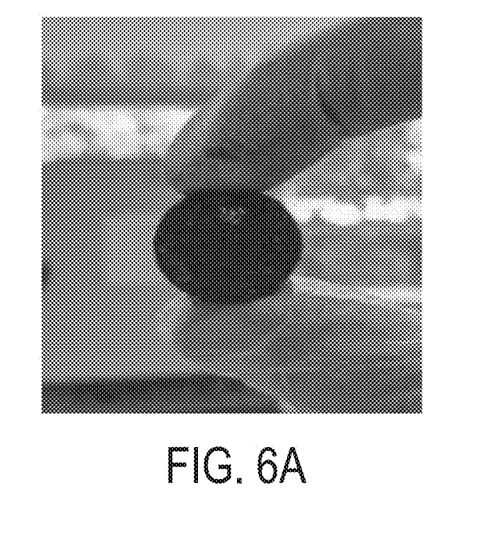
FIG. 6A is a photograph of a polymer-sand nanocomposite prepared in accordance with one or more embodiments described in this disclosure.
Figure 6B:
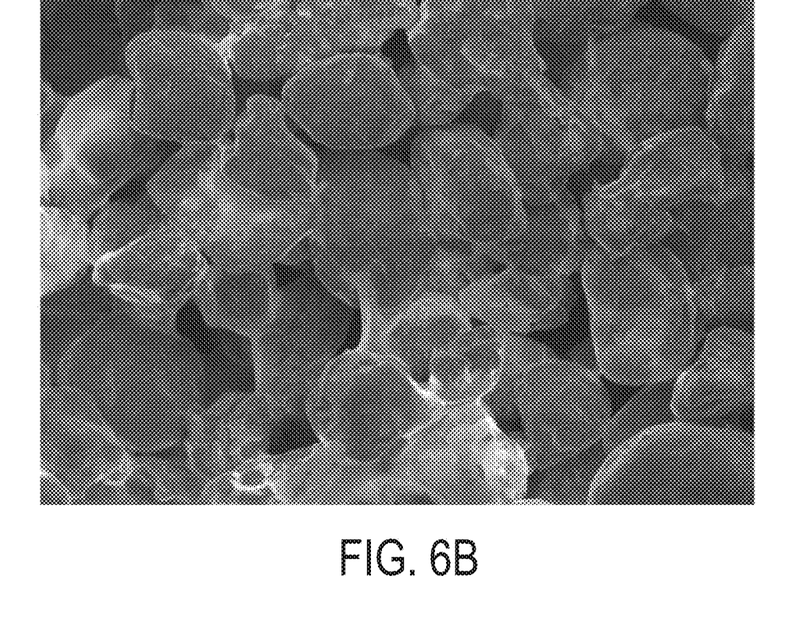
FIG. 6B is a SEM image of the polymer-sand nanocomposite of FIG. 6A.

The example polymer-sand nanocomposite is illustrated in FIGS. 6A and 6B. FIG. 6A shows the gelled characteristic of the polymer-sand nanocomposite. Further, FIG. 6B provides a SEM image which shows the connectivity between grains of the surface polymerized sand. Specifically, the individual grains of the sand-copolymer-graphene nanocomposite are entrapped by the crosslinked PAM molecules in the polymer-sand nanocomposite such that the individual grains of the sand-copolymer-graphene nanocomposite are held together. This network of connectivity and the entrapped individual grains of the sand-copolymer-graphene nanocomposite provide the barrier properties when implemented as a barrier to avoid lost circulation zones.

It should now be understood the various aspects of the method of preparing a polymer-sand nanocomposite lost circulation material and associated method of forming a barrier to overcome lost circulation in a subterranean formation utilizing the same are described and such aspects may be utilized in conjunction with various other aspects.

According to a first aspect, a method of forming a barrier to overcome lost circulation in a subterranean formation includes injecting a polymer-sand nanocomposite into one or more lost circulation zones in the subterranean formation, the polymer-sand nanocomposite comprising sand mixed with a polymer hydrogel. The polymer hydrogel comprises a hydrogel polymer, an organic cross-linker, and a salt. Further, the sand comprises a surface modification.

A second aspect includes the method of the first aspect in which the hydrogel polymer is selected from polyacrylamide, polyacyrlonitrile, polyvinyl alcohol, polyethylene terephthalate, polybutylene terephthalate, hydrolyzed PAM, polycarbonate, polyethylene, polyurethane, polypropylene, acrylonitrile butadiene styrene.

A third aspect includes the method of the first or second aspects in which the salt is a monovalent salt, a divalent salt, or a combination of monovalent and divalent salts.

A fourth aspect includes the method of any of the first through third aspects in which the polymer hydrogel further comprises a non-functionalized graphene such that the polymer-sand nanocomposite comprises 0.01 to 4 weight percent of the non-functionalized graphene.

A fifth aspect includes the method of any of the first through fourth aspects in which the polymer hydrogel further comprises a filler, the filler comprising zirconium hydroxide.

A sixth aspect includes the method of the fifth aspect in which the filler is ZrG5.

A seventh aspect includes the method of any of the first through sixth aspects in which the surface modification of the sand comprises attachment of an organic cross-linker.

An eighth aspect includes the method of the seventh aspect in which the organic cross-linker is a mixture of hydroquinone and hexamethylenetetramine.

A ninth aspect includes the method of any of the first through fifth aspects in which the surface modification of the sand comprises a surface polymerization.

A tenth aspect includes the method of the ninth aspect in which the surface polymerization comprises two or more of polystyrene, poly(methyl methacrylate), polyacyrlonitrile, polyvinyl alcohol, polyethylene terephthalate, polybutylene terephthalate, hydrolyzed polyacrylamide, polycarbonate, polyethylene, polyurethane, polypropylene, and acrylonitrile butadiene styrene.

An eleventh aspect includes the method of the ninth aspect in which the surface polymerization comprises the polymerization product of styrene, methyl methacrylate, and divinyl benzene.

A twelfth aspect includes the method of any of the ninth through eleventh aspects in which the surface polymerization further comprises 2 to 8 weight percent of a non-functionalized graphene.

A thirteenth aspect includes the method of any of the first through twelfth aspects in which the sand consists of sand particles have a size distribution of 20 to 40 mesh.

A fourteenth aspect includes the method of any of the first through thirteenth aspects in which the sand, the hydrogel polymer, the organic cross-linker, and the salt are injected into the subterranean formation split between two or more separate streams such that the polymer-sand nanocomposite is formed in-situ.

According to a fifteenth aspect a method of preparing a polymer-sand nanocomposite lost circulation material includes applying a surface modification comprising attachment of an organic cross-linker to the surface of sand particles by: preparing a cross-linker solution comprising one or more organic cross-linkers; combining the cross-linker solution and the sand particles to generate a cross-linker modified sand precursor; and heating the cross-linker modified sand precursor to a temperature of 120 to 180° C. for at least 2 hours to generate a cross-linker modified sand. The method further includes preparing a polymer hydrogel by combining a hydrogel polymer, additional organic cross-linker, and a salt; and combining the polymer hydrogel and the cross-linker modified sand to form the polymer-sand nanocomposite.

A sixteenth aspect includes the method of the fifteenth aspect in which the cross-linker solution comprises a mixture of hydroquinone and hexamethylenetetramine.

A seventeenth aspect includes the method of the sixteenth aspect in which the hydroquinone and hexamethylenetetramine are each provided as 0.5 to 2 wt. % of the cross-linker modified sand precursor.

An eighteenth aspect includes the method of any of the fifteenth through seventeenth aspects in which the hydrogel polymer is selected from polyacrylamide, polyacyrlonitrile, polyvinyl alcohol, Polyethylene terephthalate, polybutylene terephthalate, hydrolyzed PAM, polycarbonate, polyethylene, polyurethane, polypropylene, and acrylonitrile butadiene styrene.

An nineteenth aspect includes the method of any of the fifteenth through eighteenth aspects in which the salt is a monovalent salt, a divalent salt, or a combination of monovalent and divalent salts.

A twentieth aspect includes the method of the nineteenth aspect in which the salt is KCl.

A twenty-first aspect includes the method of any of the fifteenth through twentieth aspects in which the cross-linker modified sand further comprises a surface polymerization.

A twenty-second aspect includes the method of the twenty-first aspect in which the surface polymerization comprises two or more of polystyrene, poly(methyl methacrylate), polyacyrlonitrile, polyvinyl alcohol, polyethylene terephthalate, polybutylene terephthalate, hydrolyzed polyacrylamide, polycarbonate, polyethylene, polyurethane, polypropylene, and acrylonitrile butadiene styrene.

A twenty-third aspect includes the method of the twenty-first aspect in which the surface polymerization comprises the polymerization product of styrene, methyl methacrylate, and divinyl benzene.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. A method of forming a barrier to overcome lost circulation in a subterranean formation, the method comprising:
    injecting a polymer-sand nanocomposite into one or more lost circulation zones in the subterranean formation, the polymer-sand nanocomposite comprising sand mixed with a polymer hydrogel,
    where the polymer hydrogel comprises a hydrogel polymer, an organic cross-linker, and a salt, and
    where the sand comprises a surface modification.

2. The method of claim 1, where the hydrogel polymer is selected from the group consisting of polyacrylamide, polyacyrlonitrile, polyvinyl alcohol, polyethylene terephthalate, polybutylene terephthalate, hydrolyzed PAM, polycarbonate, polyethylene, polyurethane, polypropylene, and acrylonitrile butadiene styrene.

3. The method of claim 1, where the salt is a monovalent salt, a divalent salt, or a combination of monovalent and divalent salts.

4. The method of claim 1, where the polymer hydrogel further comprises a non-functionalized graphene such that the polymer-sand nanocomposite comprises 0.01 to 4 weight percent of the non-functionalized graphene.

5. The method of claim 1, where the polymer hydrogel further comprises a filler, the filler comprising zirconium hydroxide.

6. The method of claim 5, where the filler is ZrG5.

7. The method of claim 1, where the surface modification of the sand comprises attachment of the organic cross-linker.

8. The method of claim 7, where the organic cross-linker is a mixture of hydroquinone and hexamethylenetetramine.

9. The method of claim 1, where the surface modification of the sand comprises a surface polymerization.

10. The method of claim 9, where the surface polymerization comprises two or more of polystyrene, poly(methyl methacrylate), polyacyrlonitrile, polyvinyl alcohol, polyethylene terephthalate, polybutylene terephthalate, hydrolyzed polyacrylamide, polycarbonate, polyethylene, polyurethane, polypropylene, and acrylonitrile butadiene styrene.

11. The method of claim 9, where the surface polymerization comprises the polymerization product of styrene, methyl methacrylate, and divinyl benzene.

12. The method of claim 10, where the surface polymerization further comprises 2 to 8 weight percent of a non-functionalized graphene.

13. The method of claim 1, where the sand consists of sand particles have a size distribution of 20 to 40 mesh.

14. A method of forming a barrier to overcome lost circulation in a subterranean formation, the method comprising
    injecting sand comprising a surface modification, a hydrogel polymer, an organic cross-linker, and a salt into one or more lost circulation zones, where the sand, the hydrogel polymer, the organic cross-linker, and the salt are injected into the subterranean formation split between two or more separate streams such that a polymer-sand nanocomposite comprising the hydrogel polymer, the organic cross-linker, and the salt is formed in-situ.

15. The method of claim 14, where the hydrogel polymer is selected from the group consisting of polyacrylamide, polyacyrlonitrile, polyvinyl alcohol, polyethylene terephthalate, polybutylene terephthalate, hydrolyzed PAM, polycarbonate, polyethylene, polyurethane, polypropylene, and acrylonitrile butadiene styrene.

16. The method of claim 14, where the polymer hydrogel further comprises a non-functionalized graphene such that the polymer-sand nanocomposite comprises 0.01 to 4 weight percent of the non-functionalized graphene.

17. The method of claim 14, where the polymer hydrogel further comprises a filler, the filler comprising zirconium hydroxide.

18. The method of claim 14, where the surface modification of the sand comprises attachment of the organic cross-linker.

19. The method of claim 18, where the organic cross-linker is a mixture of hydroquinone and hexamethylenetetramine.

20. The method of claim 14, where the surface modification of the sand comprises a surface polymerization.

21. The method of claim 20, where the surface polymerization comprises two or more of polystyrene, poly(methyl methacrylate), polyacyrlonitrile, polyvinyl alcohol, polyethylene terephthalate, polybutylene terephthalate, hydrolyzed polyacrylamide, polycarbonate, polyethylene, polyurethane, polypropylene, and acrylonitrile butadiene styrene.

22. The method of claim 20, where the surface polymerization comprises the polymerization product of styrene, methyl methacrylate, and divinyl benzene.

23. The method of claim 21, where the surface polymerization further comprises 2 to 8 weight percent of a non-functionalized graphene.

* * * * *